Figure 1:
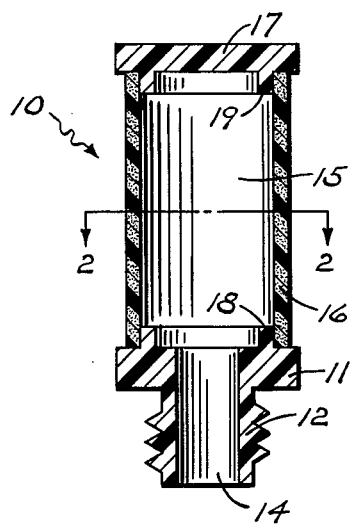

May 8, 1962  J. C. DUDDY  3,033,911

VENT PLUG

Filed July 30, 1958

INVENTOR.
JOSEPH C. DUDDY
BY
ATTORNEY

United States Patent Office 3,033,911
Patented May 8, 1962

3,033,911
VENT PLUG
Joseph C. Duddy, Trevose, Pa., assignor to The Electric Storage Battery Company, a corporation of New Jersey
Filed July 30, 1958, Ser. No. 752,056
2 Claims. (Cl. 136—177)

The present invention generally relates to means which are operable to differentiate between the passage therethrough of liquids and gases. While the present invention is by no means limited to storage battery applications, it is particularly adapted for use as a storage battery vent plug to prevent the spillage or leakage of electrolyte when the battery is inverted or tilted from its normal plane of use.

In certain battery applications, particularly aircraft, there is a possibility that electrolyte, which may either be acid or alkaline, will spill or leak from the battery when the battery is inverted. If this should happen, not only will the battery itself be harmed and its life shortened by the loss of electrolyte, but the vehicle may also be damaged by the corrosive action of the spilled electrolyte.

This problem has long been known to the battery industry and various attempts have been proposed to solve the problem. The most successful of these utilizes a weight-operated mechanical valve which remains open to vent gases from the battery when the battery is in its normal plane of use and which closes to prevent the loss of electrolyte when the battery is inverted or tilted. While valve type vent plugs have been to a certain extent satisfactory, since they are mechanical, they are inherently subject to failures. For example, if the battery is inverted during periods of charging, at which time appreciable amounts of gas are evolved, the valve will close to prevent the loss of electrolyte but, upon return of the battery to its normal position, the valve may not be able to open against back pressure built up within the battery during inversion. If this happens, the pressure within the battery may build up to a point where an explosion may occur. Still further, the functional elements of mechanical vent plugs often become clogged with battery sediment and the device fails in the open position which will result in the leakage of electrolyte from the battery upon a subsequent inversion.

Accordingly, it is an object of the present invention to provide a new and improved non-mechanical vent plug which is operative to vent gases generated within a battery when the battery is operated in its normal plane of use and to prevent the loss of electrolyte when the battery is tilted or inverted.

Another object of the present invention is to provide a vent plug characterized by simplicity of construction and reliability of performance.

Still another object of the present invention is to utilize certain hydrophobic microporous resins which are operative to differentiate between the passage therethrough of liquids and gases to provide a new and improved venting means.

The present invention utilizes a synthetic resin which has been rendered microporous by having included therein a suitable pore-forming material which is subsequently removed by chemical treatment. The microporous resin is then treated with a liquid repellent to enhance the natural hydrophobic character of the resin. In this manner there is provided a material having pores which will permit gases to pass therethrough but which are of such size and of such a hydrophobic nature that, due to the relatively high interfacial tension of the liquid electrolyte on the medium, they will prevent the passage therethrough of the electrolyte. In accordance with the present invention a chamber, having walls of the hydrophobic microporous resin, is mounted on a conventional vent plug base to provide a non-spill vent plug which is unique in its non-complex design, rugged, reliable, and free from types of failures which are inherent in mechanical type vent plugs.

Figure 2:
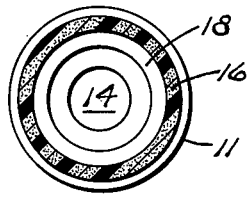

A better understanding of the present invention may be had from the following description when read with reference to the accompanying drawings of which:

FIG. 1 is a side elevation of the vent plug of the present invention taken in cross section; and FIG. 2 is a top elevation of the vent plug of the present invention taken along the line 2—2 of FIG. 1.

Referring now to the drawings, the numeral 10 designates the vent plug of the present invention. The vent plug 10 has a base 11 terminating in a reduced portion 12 which is externally threaded for connecting the vent plug to a battery. The base portion 11 has a passageway 14 which communicates directly with a chamber 15 defined by a microporous sleeve 16 and a top cap 17. As shown, the sleeve 16 seats on the upper surface of the base 11 around a raised rib 18 which is formed thereon. The top 17 is adapted to fit on the sleeve 16 with the rib 19, formed on the lower surface of the top 17, fitting inside of the sleeve 16. The sleeve 16 is joined to the base 11 and the top 17 at the ribs 18 and 19, respectively, by means of a suitable sealing compound or by means of a heat seal.

The sleeve 16 is made from a microporous material such as a synthetic resin rendered microporous by having included therein a pore-forming material which is subsequently removed. Certain synthetic resins have been found suitable for this purpose. These include, for example, polyethylene, polypropylene, polystyrene, and polyvinyl chloride. The sleeve 16, however, is preferably made from a specific type of polyethylene, namely an isotactic polymer of ethylene, because a resin of this type, when rendered microporous, is more rigid and has better high temperature characteristics which qualities permit a simplification of vent plug design. However, while isotactic polymers of ethylene are preferred because of their aforementioned characteristics, it should be understood that with the inclusion of suitable supporting structure, the sleeve 16 may be made from other microporous resins. Some examples of commercially available isotactic polymers of ethylene are Hi-Fax, type 1604–F, manufactured by the Hercules Powder Co.; DMDA, manufactured by the Bakelite Co.; and Marlex 50, manufactured by Phillips Petroleum Co.

By way of illustration and example and not by way of limitation, the microporous sleeve 16 may be made by intimately mixing four parts by weight of a suitable poreforming agent such as corn starch to one part by weight of DMDA resin at a temperature of about 300° F. in an intensive mixer, or Banbury mill. In addition to starch, sugar and certain salts are also suitable for use as poreforming agents. When the plasticization and mixing of the starch and resin have been completed, the mixture may be withdrawn from the mixer and extruded to form tubing of a diameter suitable for the sleeve 16. The cylindrical product of extrusion may then be cut to suitable lengths to form the sleeve 16. While it is preferable that the sleeve 16 be extruded so as not to have a seam, it should be understood that the sleeve may be fabricated from a sheet of the resin which has been calendered to a suitable thickness.

Several techniques are available for removing the poreforming material from the resin to render the sleeve 16 microporous. By way of example, the sleeve 16 may be first immersed for about 30 minutes in a 3 percent solution of hydrochloric acid at a temperature of about 212° F. Next, the sleeve 16 is immersed for about 30 minutes in a 3 percent solution of potassium hydroxide at a temperature of about 170° F. This bath is then followed by repeated baths in distilled water of decreasing temperatures. After a thorough washing, the sleeve is then air-dried before fabrication into the final vent plug form. The microporous material produced by the aforementioned treatment has pores ranging in size from as small as 0.84 micron in diameter to as large as 9.6 microns in diameter with the average pore size being about 2.0 microns as measured by a Winslow porosimeter.

As mentioned hereinbefore, the vent plug top 17 and the base 11 may be joined to the sleeve 16 by means of a suitable sealing compound or by means of a heat seal. While the top 17 and the base 11 may be made of any suitable material, such as polyethylene, polypropylene, polystyrene, polyvinyl chloride, or an epoxy resin, it is preferable that they be made of the same material as the sleeve 16 in order that the best seal may be obtained with the sleeve. An effective heat seal between the parts of the present invention has been obtained by providing a temperature of about 260° F. at the surface junctions under consideration. If another type of seal is desired for joining together the parts of the vent plug, an epoxy resin compound may be used in conjunction with Hydropol TP polymer, manufactured by the Phillips Petroleum Company.

After fabrication into final plug form, the sleeve 16 is chemically treated to enhance the natural hydrophobic character of the material. For this purpose, silicone water repellents have been found particularly satisfactory. An example of a suitable commercially available water repellent is Dri-Film SC-77, manufactured by the General Electric Co. Dri-Film SC-77 is a mixture of dimethyl dichlorosilane and methyltrichlorsilane, a clear liquid with a boiling point between 151° F. and 158° F. One method of treating the porous sleeve with the water repellent is to employ standard vacuum impregnation techniques. Another method is to immerse the plug in a 1% water-acetone solution. Immediately upon the evaporation of the acetone, the vent plug may be subjected to a vapor phase hydrolysis with the repellent. The water remaining in the porous matrix undergoes hydrolysis with the repellent resulting in a controlled thickness deposit of silicone resin on the walls of the pore in the sleeve, this deposit subsequently being polymerized by a suitable heat treatment. A cure of about 3 hours at a temperature of about 160° F. has been found satisfactory to fully polymerize the silicone deposit.

The vent plug of the present invention is designed to provide reliable, trouble free service under the most severe conditions. The mechanical valves of prior art vent plugs have been eliminated and therewith the failures inherent in mechanical devices. In place of such mechanical valves, the present invention utilizes a microporous synthetic resin having pores which permit gases to pass therethrough but of such a size and of such a hydrophobic nature that, due to the relatively high interfacial tension of the liquid electrolyte on the medium, they prevent the passage therethrough of electrolyte. The hydrophobic nature of the sleeve tends to prevent the adherence thereto of materials which might tend to block the pores. In addition, the pressure gradient through the sleeve, which exists when the vent plug is in use, is from the inside of the plug to the outside which also tends to prevent the adherence of particles to the outside of the sleeve. To prevent sediment particles carried by the battery electrolyte from depositing on the inside surface of the sleeve 16, the passage 14 and the base 11 have been made large and unobstructed. As a result, the turbulence created in the electrolyte when it drains back into the battery following inversion is operative to counteract any tendency of such sediment to permanently deposit on the interior wall of the sleeve 16.

It should be obvious to those skilled in the art that while the vent plug of the present invention has been illustrated by means of an embodiment utilizing the microporous resin in the shape of a cylindrical sleeve, that other geometric configurations may be used without departing from the spirit of the invention. For example, the microporous resin may be fabricated into a dome shaped configuration or it may be in the form of a flat diaphragm. In addition, it should be noted that where the microporous sleeve is made from synthetic resins having less rigidity than that of isotactic polymers of ethylene, that a supporting structure may be utilized in connection with the microporous resin without departing from the spirit of the present invention.

It should also be understood that while the present invention has been illustrated in the form of a battery vent plug, that it is equally applicable for other uses where it is desirable to differentiate between the passage of liquids and gases. Thus, the present invention is applicable for use on any type of container for liquids in which gases may be generated. In addition, it is equally adapted for use in applications where it is necessary to retain liquids within a member and simultaneously permit gases to enter the member as in aeration equipment.

Having described the present invention, that which is claimed is:

1. In combination, a container for a storage battery containing free electrolyte and a non-spill vent plug for said battery container comprising, in combination, a base portion adapted to be secured to said battery, a sleeve of microporous polyethylene having pores of an average diameter of about 2.0 microns mounted on said base, said microporous polyethylene having a polymeric layer of silicone deposited thereon, said top and said sleeve defining a cylindrical chamber on said base, and a large unobstructed passage in said base communicating said chamber with the interior of said battery container.

2. Combination as specified in claim 1 wherein said polyethylene is an isotactic polymer.

References Cited in the file of this patent

UNITED STATES PATENTS

| | | |
|---|---|---|
| 2,371,868 | Berg | Mar. 20, 1945 |
| 2,542,527 | Honey | Feb. 20, 1951 |
| 2,717,610 | Gill | Sept. 13, 1955 |
| 2,719,537 | Gildersleeve | Oct. 4, 1955 |
| 2,858,354 | Dickover | Oct. 28, 1958 |

OTHER REFERENCES

Silicones and Their Uses, by McGregor, copyright 1954, McGraw-Hill Book Co., pages 49–51.